United States Patent
Liu

(10) Patent No.: US 9,814,039 B2
(45) Date of Patent: Nov. 7, 2017

(54) METHOD AND APPARATUS FOR CONFIGURING SRS RESOURCE FOR COOPERATING CELLS

(71) Applicant: ZTE CORPORATION, Shenzhen, Guangdong Province (CN)

(72) Inventor: Na Liu, Shenzhen (CN)

(73) Assignee: XI'AN ZHONGXING NEW SOFTWARE CO., LTD., Xi'An (CN)

( * ) Notice: Subject to any disclaimer, the term of this patent is extended or adjusted under 35 U.S.C. 154(b) by 190 days.

(21) Appl. No.: 14/649,767

(22) PCT Filed: Oct. 12, 2013

(86) PCT No.: PCT/CN2013/085126
§ 371 (c)(1),
(2) Date: Jun. 4, 2015

(87) PCT Pub. No.: WO2014/086203
PCT Pub. Date: Jun. 12, 2014

(65) Prior Publication Data
US 2015/0305027 A1    Oct. 22, 2015

(30) Foreign Application Priority Data

Dec. 7, 2012   (CN) .......................... 2012 1 0521505

(51) Int. Cl.
*H04L 5/00* (2006.01)
*H04W 72/04* (2009.01)

(52) U.S. Cl.
CPC ....... *H04W 72/0446* (2013.01); *H04L 5/0048* (2013.01); *H04L 5/0073* (2013.01); *H04L 5/008* (2013.01); *H04L 5/0035* (2013.01)

(58) Field of Classification Search
None
See application file for complete search history.

(56) References Cited

U.S. PATENT DOCUMENTS

2008/0318608 A1   12/2008  Inoue et al.
2010/0322115 A1   12/2010  Wei et al.
(Continued)

FOREIGN PATENT DOCUMENTS

CN    101714897 A    5/2010
CN    101867938 A    10/2010
(Continued)

OTHER PUBLICATIONS

Proposal for an Enhanced SRS Scheme for CoMP, 3GPP TSG-RAN WG1 #59bis Valencia, Spain Jan. 2010.*
(Continued)

*Primary Examiner* — Hassan Phillips
*Assistant Examiner* — Ayanah George
(74) *Attorney, Agent, or Firm* — Plumsea Law Group, LLC

(57) ABSTRACT

Disclosed are a method and apparatus for configuring Sounding Reference Signal (SRS) resource of cooperating cells. The method includes: grouping all cells into different cell groups; determining a SRS initial time domain resource configuration order of each cell group; determining a SRS resource grouping policy of the cells according to state information of user equipments; and configuring SRS resources for the user equipments accessing each cell according to the SRS initial time domain resource configuration order and the SRS resource grouping policy.

16 Claims, 5 Drawing Sheets

(56) References Cited

U.S. PATENT DOCUMENTS

| | | | |
|---|---|---|---|
| 2011/0098054 A1* | 4/2011 | Gorokhov | H04B 7/024 455/452.1 |
| 2012/0149297 A1 | 6/2012 | Suh et al. | |
| 2013/0039305 A1 | 2/2013 | Kishiyama et al. | |
| 2013/0229989 A1* | 9/2013 | Natarajan | H04W 72/042 370/329 |

FOREIGN PATENT DOCUMENTS

| | | |
|---|---|---|
| CN | 102469601 A | 5/2012 |
| EP | 2424285 A1 | 2/2009 |
| JP | 2009004926 A | 1/2009 |
| JP | 2011250386 A | 12/2011 |
| WO | 2011021837 A2 | 2/2011 |

OTHER PUBLICATIONS

English description dated Dec. 8, 2011 of corresponding document JP2011250386 A.

English description dated Jan. 8, 2009 of corresponding document JP2009004926 A.

Japanese Office Action dated Jun. 7, 2016 Japanese patent application No. 2015-545647.

Potevio "Proposal for an Enhanced SRS Scheme for coMP" 3GPP TSG-RAN WG1 #59bis Valencia, Spain, Jan. 18-22, 2010, R1-100616.

Yoshiaki Ofuji et al. "Group-Wised Reference Signal Allocation for Single-Carrier FDMA Radio Access in Evolved UTRA Upink", 2007, IEEE.

European Search Report dated Oct. 2, 2015 in European Patent Application No. EP13861118.1.

* cited by examiner

METHOD AND APPARATUS FOR CONFIGURING SRS RESOURCE FOR COOPERATING CELLS

CROSS-REFERENCE TO RELATED APPLICATION(S)

This application is the U.S. National Phase application of PCT application number PCT/CN2013/085126 having a PCT filing date of Oct. 12, 2013, which claims priority of Chinese patent application 201210521505.3 filed on Dec. 7, 2012, the disclosures of which are hereby incorporated by reference.

TECHNICAL FIELD

The present document relates to the field of mobile communication technologies, and more particularly, to a method and apparatus for configuring sounding reference signal (SRS) resources of cooperating cells.

BACKGROUND OF THE RELATED ART

International Telecommunications Union (ITU) sets forth very stringent requirements for performance of the next generation mobile communication system (that is, International Mobile Telecommunications-Advanced, IMT-A system), for example, when the maximum system transmission bandwidth reaches to 100 MHz, the peak rates of uplink and downlink data transmission need to reach to 1 G bps and 500M bps respectively; which has a very high demand on the average spectrum efficiency, especially the edge spectrum efficiency of the system. In order to meet the requirements of the IMT-Advanced new system, the Third Generation Partnership Project (3GPP) proposed to use the co-ordinated multi-point (CoMP) transmission technology to improve the performance of system in its next-generation mobile cellular communication system (that is, the Long Term Evolution Advanced (LTE-A) system). The CoMP transmission technology is that a plurality of geographically separated transmission points coordinately participating in data transmission of one terminal or jointly receiving data transmitted by one terminal. A plurality of transmission points participating in the coordination generally refers to base stations of different cells.

The sounding reference signal (SRS) is a signal used between a user equipment (UE) and an evolved Node B (eNB) for measuring the uplink channel quality. In the LTE system, the UE regularly sends the SRS on the last symbol of the transmitted subframe in accordance with parameters such as bandwidth, frequency domain location, sequence cyclic shift, period and subframe offset specified by the eNodeB. For the FDD (Frequency Division Duplexing) system, the eNB measures the uplink channel state information of the UE according to the received SRS and performs frequency domain selective scheduling, closed loop power control and other operations according to the uplink channel quality. For the TDD (Time Division Duplexing) system, it may also use the reciprocity of uplink and downlink channels to perform operations such as downlink scheduling or coordinated scheduling.

In the CoMP applications, all the cells participating in the coordination are required to obtain the state information of the channel from the terminal to its own cell. Therefore, all coordinated cells are required to correctly receive the SRS sent by the UE. Therefore, how to reasonably allocate the SRS resource and minimize the inter-cell SRS interference is very important.

In the related art, the allocation method used by each cell is often the same, which will lead to serious inter-cell SRS interference, cause very large measurement error, and ultimately make the CoMP performance less than expected.

SUMMARY

The embodiment of the present invention provides a method and apparatus for configuring sounding reference signal resource of cooperating cells to solve the problem of serious inter-cell SRS interference in the related art.

The embodiment of the present invention provides a method for configuring sounding reference signal (SRS) resource of cooperating cells, comprising:

grouping all cells into different cell groups;

determining a SRS initial time domain resource configuration order of each cell group;

determining a SRS resource grouping policy of the cell according to state information of user equipment; and configuring SRS resources for user equipments accessing each cell according to the SRS initial time domain resource configuration order and the SRS resource grouping policy.

Alternatively, grouping all the cells into different cell groups comprises:

grouping all the cells into different cell groups in accordance with a principle that adjacent cells are not in the same cell group.

Alternatively, determining the SRS initial time domain resource configuration order of each cell group comprises:

performing statistics on the number of SRS symbols within a predetermined reference time period to obtain the number of SRS symbols N according to a SRS sub-frame configuration; and allocating SRS initial time domain resources to each cell group and determining the SRS initial time domain resource configuration order of each cell group according to the number of SRS symbols N.

Alternatively, determining the SRS resource grouping policy of the cell according to the state information of the user equipment (UE) comprises:

dividing each time domain SRS resource into S groups, wherein S=2M, and M is a ratio of a cell SRS bandwidth to a UE SRS bandwidth; a total code tree set corresponding to different frequency division resources and comb division resources being marked as $\Phi$, wherein, $\Phi=\{k\epsilon Z, 0\leq k\leq S-1, Z \text{ is an integer}\}$; and when there are x kinds of state information of the UE, each kind of state information of the UE corresponding to one code tree subset GroupAi, wherein, GroupAi=$\{k|\text{mod }(k, x)=i\}$, i$\epsilon$(0, 1, . . . , x-1), GroupAi=$\{k|\text{mod }(k, x)=i\}$ represents a set of remainder i obtained from k divided by x.

Alternatively, configuring SRS resources for user equipments accessing each cell comprises:

when a user equipment establishes an initial connection, allocating an initial SRS resource for the user equipment according to a SRS initial time domain resource configuration order corresponding to the cell to which the user equipment belongs, as well as an initial frequency domain resource order of GroupA0>GroupA1>GroupA2> . . . > GroupA(X-1).

Alternatively, configuring SRS resources for user equipments accessing each cell comprises:

after obtaining the state information of a user equipment, or when the state information of a user equipment changes, obtaining latest state information i of the user equipment; and according to the latest state information i of the user equipment, configuring a GroupAi resource corresponding to the latest state information for the user equipment; and if the GroupAi does not have idle resources, configuring a SRS resource for the user equipment according to a priority order of frequency-domain resources.

Alternatively, the method further comprises: after configuring the SRS resources for UEs accessing each cell, within a set time period, performing statistics on the number of UEs accessing each cell for multiple times to obtain the average number of UEs accessing each cell; and when the average number of UEs is less than the maximum number of orthogonal UEs supported by a system, and cells which allocate SRS resources to UEs cannot be orthogonal with each other, reconfiguring the allocated SRS resources according to the SRS initial time domain resource configuration order.

The embodiment of the present invention further provides an apparatus for configuring sounding reference signal (SRS) resources of cooperating cells, comprising:

a grouping unit, configured to: grouping all cells into different cell groups;

an initial time domain order determining unit, configured to: determine a SRS initial time domain resource configuration order of each cell group;

a SRS resource grouping policy determining unit, configured to: determine a SRS resource grouping policy of the cell according to the state information of the UEs; and a SRS resource configuring unit, configured to: configure SRS resources for UEs accessing each cell according to the SRS initial time domain resource configuration order and the SRS resource grouping policy.

Alternatively, the grouping unit is configured to group all the cells into different cell groups in a following way:

grouping all the cells into different cell groups in accordance with a principle that adjacent cells are not in the same cell group.

Alternatively, the initial time domain order determining unit is configured to determine the SRS initial time domain resource configuration order of each cell group in a following way:

performing statistics on the number of SRS symbols within a predetermined reference time period to obtain the number of SRS symbols N according to a SRS subframe configuration; and allocating SRS initial time domain resources to each cell group and determining the SRS initial time domain resource configuration order of each cell group according to the number of SRS symbols N.

Alternatively, the SRS resource grouping policy determining unit is configured to determine the SRS resource grouping policy of a cell in accordance with the information state of the user equipment in a following way:

grouping each SRS time domain resource into S groups, wherein S=2M, and M is a ratio of a cell SRS bandwidth to a UE SRS bandwidth; a total code tree set corresponding to different frequency division resources and comb division resources being marked as Φ, wherein, Φ={k∈Z, 0≤k≤S−1, Z is an integer}; and when there are x kinds of state information of the user equipment, each kind of state information of the user equipment corresponding to one code tree subset GroupAi, wherein, GroupAi={k|mod (k, x)=i}, i∈(0, 1, ..., x−1), GroupAi={k|mod (k, x)=i} represents the set of remainder i obtained from k divided by x.

Alternatively, the SRS resource configuring unit is configured to configure SRS resources for UEs accessing each cell in a following way:

when a UE establishes an initial connection, allocating an initial SRS resource to the UE according to a SRS initial time domain resource configuration order corresponding to the cell to which the UE belongs, and an initial frequency domain resource order of GroupA0>GroupA1>GroupA2> ... >GroupA(X−1).

Alternatively, the SRS resource configuring unit is configured to configure the SRS resources for user equipments accessing each cell in a following way:

after obtaining the state information of a user equipment, or when the state information of a user equipment changes, obtaining the latest state information i of the user equipment; and according to the latest state information i of the user equipment, configuring the GroupAi resource corresponding to the latest state information for the user equipment; and if the GroupAi does not have idle resources, configuring a SRS resource for the user equipment according to a priority order of frequency domain resources.

Alternatively, the apparatus further comprises:

a SRS resource reconfiguring unit, which is configured to: within a set time period, perform statistics on the number of UEs accessing each cell for multiple times to obtain an average number of UEs accessing each cell; when the average number of UEs is less than the maximum number of orthogonal UEs supported by a system, and the cells which allocate SRS resources to the UEs cannot be orthogonal with each other, reconfigure the allocated SRS resources according to the SRS initial time domain resource configuration order.

The method and apparatus in accordance with the embodiment of the present invention can be used to reduce signaling interaction of respective cooperating cells in the CoMP, and also have regularity in the SRS resource allocation, which can effectively suppress inter-cell and intra-cell interferences and improve the spectrum efficiency of the system, especially improve the spectrum efficiency of users at the edge of the cell.

PREFERRED EMBODIMENTS OF THE INVENTION

Hereinafter, in conjunction with the accompanying drawings, the embodiments of the present invention will be described in detail. It should be noted that, in the case of no conflict, the embodiments of the present application and features in the embodiments can be combined randomly with each other.

Figure 1:
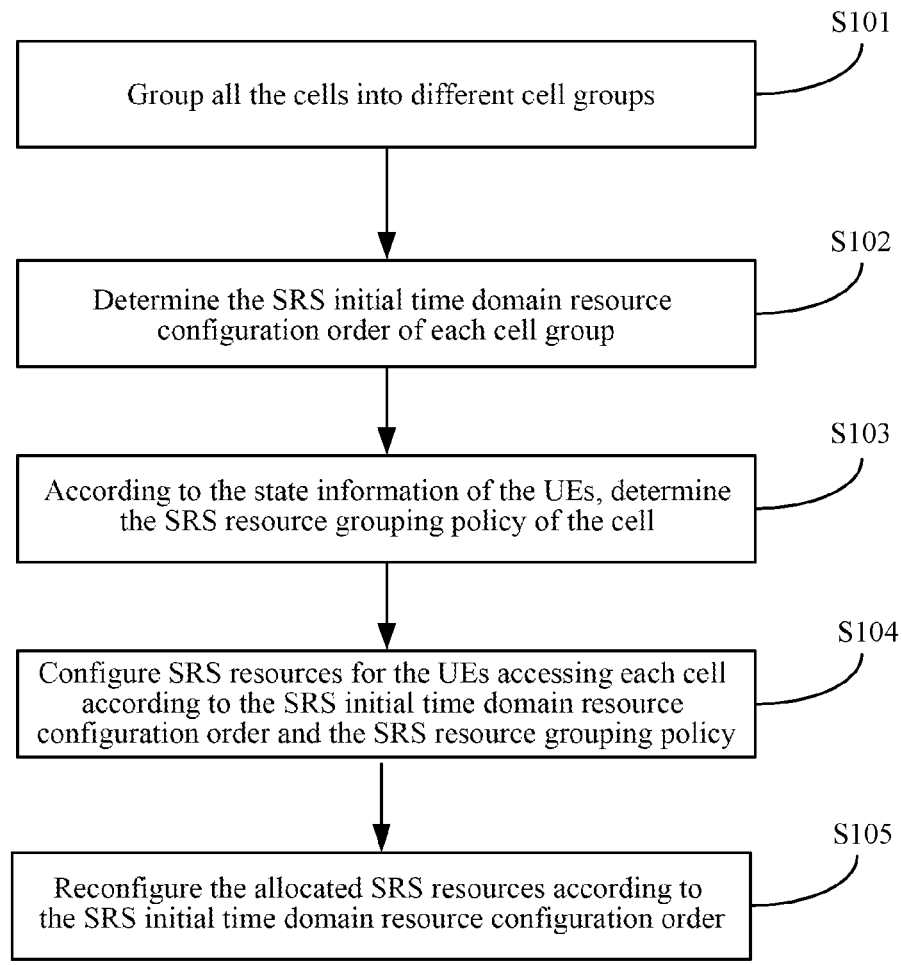
FIG. 1 is a flow chart of a method for configuring sounding reference signal resources of cooperating cells in accordance with an embodiment of the present invention.

FIG. 1 shows a method for configuring sounding reference signal resources of cooperating cells in accordance with an embodiment of the present invention, comprising the following steps:

step S101, grouping all the cells into different cell groups.

Figure 2:
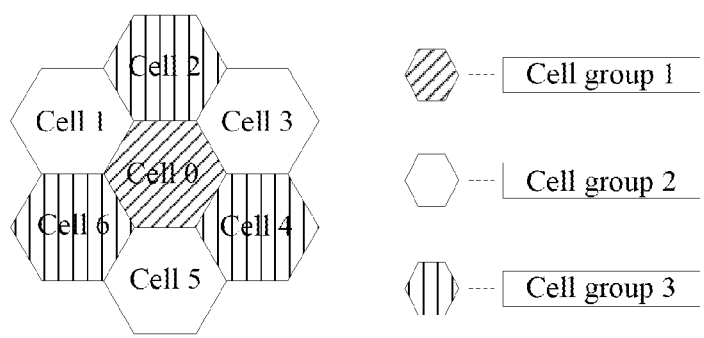
FIG. 2 is a schematic diagram of the case after grouping in the system networking in an embodiment of the present invention.

In this step, all the cells in the system are grouped into a plurality of different cell groups according to the system networking mode; the allocation method can be any method, however, in order to more effectively suppress the inter-cell interference, preferably the cells are grouped in accordance with the principle that adjacent cells are not in the same cell group. For example, as shown in FIG. 2, in FIG. 2, the cell 0 is in the cell group 1, the cells 1, 3 and 5 are in the cell group 2, and the cells 2, 4, 6 are in the cell group 3, and each cell group has the same allocation method.

Step S102, determining the SRS initial time domain resource allocation order of each cell group.

Figure 3:
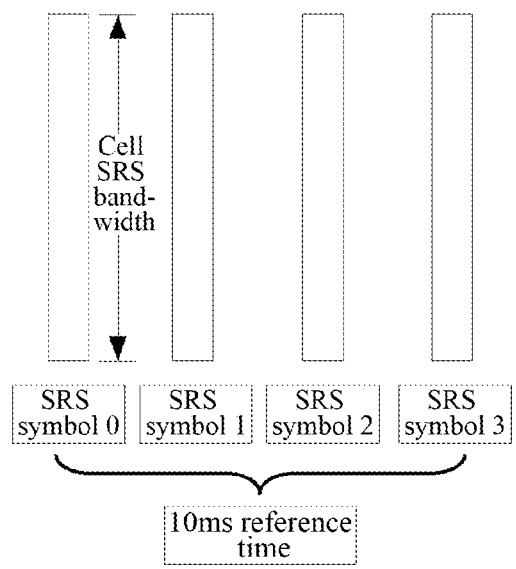
FIG. 3 is a schematic diagram of a SRS time domain resource configuration in a cell in accordance with an embodiment of the present invention.
Figure 4:
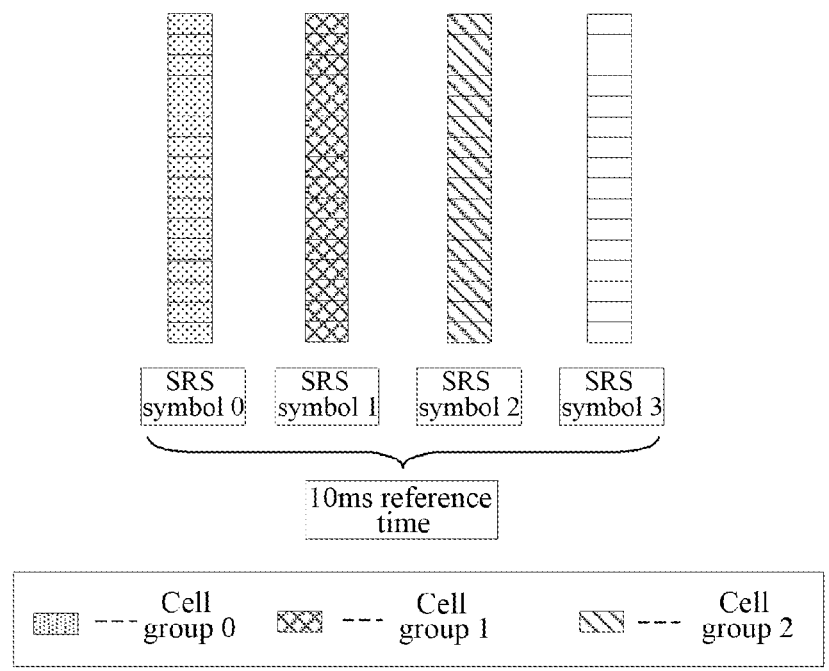
FIG. 4 is a schematic diagram of a SRS initial symbol configuration of each cell group in accordance with an embodiment of the present invention.

In this step, according to the SRS subframe configuration, statistics is performed on the number of SRS symbols in a predetermined reference time period to obtain the number of SRS symbols N; in the TDD system, the cell SRS subframe configuration index is 0, for example, the predetermined reference time period is 10 ms, wherein it comprises N=4 SRS symbols, as shown in FIG. 3;

according to the statistically collected number of SRS symbols N, the SRS initial time domain resources are allocated to each cell group, and the time domain resource order of SRS allocation of each cell group is determined;

according to the order of SRS symbol (such as 0~N−1), the SRS initial time domain resources are sequentially allocated to each group, and the SRS time domain resource order of each cell group is determined. For example, set the SRS initial time domain resource corresponding to the cell group 1 as symbol 0, the SRS initial time domain resource corresponding to the cell group 2 as symbol 1, and the SRS initial time domain resource corresponding to the cell group 3 as symbol 2, as shown in FIG. 4 (N=4 in this embodiment). The time division orders of respective cell groups are respectively: the time division order of the cell group 1 is [0, 1, 2, . . . , N−1], the time division order of the cell group 2 is [1, 2, . . . , N−1, 0], and the time division order of the cell group 3 is [2, . . . , N−1, 0, 1].

In step S103, according to the state information of the UEs, the SRS resource grouping policy of the cell is determined.

In this step, according to the cell SRS bandwidth configuration and the UE SRS bandwidth configuration, the frequency domain resources of the SRS symbol are divided into M segments, i.e., M can be obtained by dividing the cell SRS bandwidth by the UE SRS bandwidth. Each SRS time domain resource is divided into S (SrsTreeNum) groups (S=2M), the total code tree set corresponding to different frequency division resources and comb division resources is marked as Φ, then Φ={k∈Z, 0≤k≤S−1, Z is an integer}; for example, the cell SRS bandwidth is 96 RB, and the UE SRS bandwidth is configured as 24 RB, the frequency domain resource on each SRS symbol is divided into 4 segments, and each SRS time domain resource is calculated to be divided into 8 groups through the frequency division, the comb division and the code division, and the total code tree set corresponding to different frequency division resources and comb division resources is marked as Φ, then Φ={k∈Z, 0≤k≤S−1, Z is an integer};

according to the state information of the UEs, the SRS resource grouping policy of the cell is determined. Provided that there are x kinds of state information of the UE, each kind of state information of the UE corresponds to one code tree subset GroupAi, that is, the code tree subset allocated to a certain type of state information is marked as GroupAi, that is, GroupAi={k|mod (k, x)=i}, i∈(0, 1, . . . , x−1), wherein, GroupAi={k|mod (k, x)=i} represents the set of the remainder i obtained from dividing k by x.

The state information of the UE comprises: user attributes and field strength information; wherein the user attributes comprise central users or edge users; the field strength information comprises user power restricted or unrestricted; there are four (x=4) kinds of state information of the UE. The corresponding code tree subset is determined according to the state information of the UE: in the case of user power unrestricted, the code tree subset corresponding to the edge users is marked as GroupA0 and the code tree subset corresponding to the central users is marked as GroupA1; in the case of user power restricted, the code tree subset corresponding to the edge users is marked as GroupA2 and the code tree subset corresponding to the central users is marked as GroupA3. When k (k=0, 1, 2, 3, 4, 5, 6, 7) and x=4, through the calculation it can be obtained that, GroupA0={k|mod (k, x)=0}={0, 4},
GroupA1={k|mod (k, x)=1}={1, 5},
GroupA2={k|mod (k, x)=2}={2, 6},
GroupA3={k|mod (k, x)=3}={3, 7}.

In step S104, SRS resources are configured for the UEs accessing each cell according to the SRS initial time domain resource configuration order and the SRS resource grouping policy.

In this step, when a user equipment uses the RRC (Radio Resource Control) to establish an initial connection, an initial SRS resource is allocated to the user equipment according to the SRS initial time domain resource configuration order corresponding to the cell to which the user equipment belongs, as well as the initial frequency domain resource order of GroupA0>GroupA1>GroupA2> . . . > GroupA(X−1).

Figure 5:
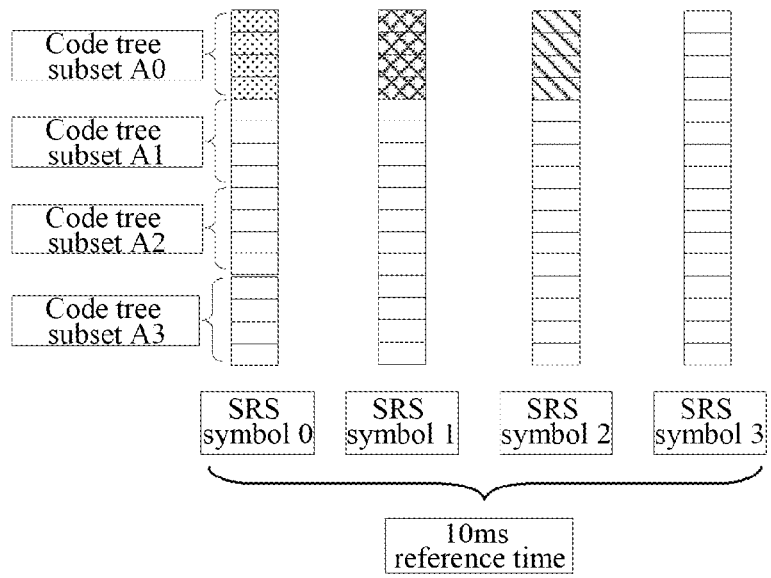
FIG. 5 is a schematic diagram of a UE SRS initial resource configuration of cooperating cells in accordance with an embodiment of the present invention.
Figure 5:
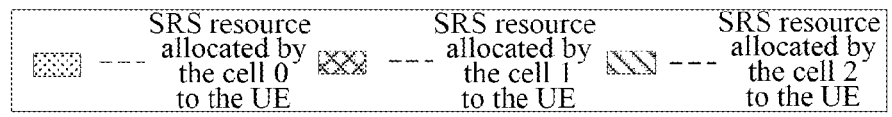

Looking for one cell from each of three cell groups, that is, cell 0, cell 1 and cell 2; when at the same time point, there is one user in each of the three cells established through the RRC initial connection, and each UE in the cell 0, the cell 1 and the cell 2 allocates the initial SRS resource to the user in accordance with the order of GroupA0> GroupA1>GroupA2>GroupA3. Therefore, one UE initially accessing the cell 0 is assigned to the position of the GroupA0 of the SRS symbol 0, one UE initially accessing the cell 1 is assigned to the position of the GroupA0 of the SRS symbol 1, and one UE initially accessing the cell 2 is assigned to the position of the GroupA0 of the SRS symbol 2, as shown in FIG. 5.

After obtaining the state information of a user equipment or the state information of a user equipment changes, appropriate resource is allocated to the user equipment according to the latest state information of the user equipment:

after the user equipment establishes an initial connection through the RRC, obtaining the state information of the UE, or, by obtaining various types of reported information such as the A3 event and the path loss state, when the state information of the UE is found to change from a certain type of state information to another type of state information, the GroupAi resource corresponding to the latest state information is configured for the user equipment according to the determined latest state information i of the UE; if the GroupAi does not have idle resources, the SRS resource is configured for the user equipment in accordance with the priority order of the frequency domain resources. For example, the SRS resource is configured for the user equipment according to the priority order of GroupA0>GroupA1>GroupA3>GroupA2> . . . >GroupA(X−1)>GroupA(X−2). The SRS resource allocation order is: frequency division, comb division, code division and time division.

In the abovementioned step, the mentioned priority order of frequency domain resources is just one example; in the actual process, the order needs to be determined in accordance with the pre-defined state information.

Figure 6:
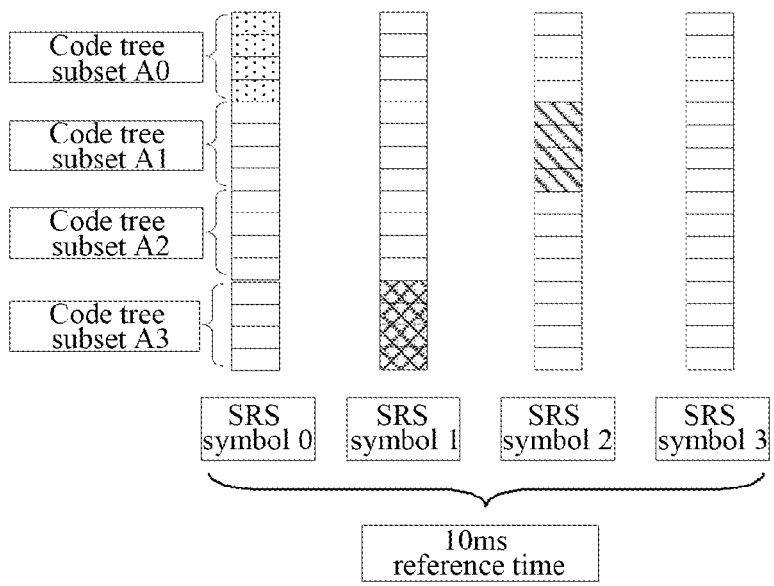
FIG. 6 is a schematic diagram of a SRS resource reconfigured by a cooperating cell for the UE according to the state information of UE in accordance with an embodiment of the present invention.
Figure 6:
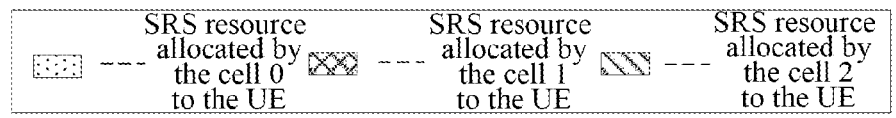

When the three cells respectively obtain the state information of the UEs within the cells: the cell 0 obtains through measurement that the UE is an edge user and the power is not restricted; the cell 1 obtains through measurement that the UE is a central user and the power is restricted; and the cell 2 obtains through measurement that the UE is a central user and the power is not restricted, and the three cells need to reconfigure SRS resources for the UEs in accordance with the following principles according to the obtained state information of UE: for an edge user in the case of user power unrestricted, the SRS resources are configured in accordance with the order of GroupA0>GroupA1>GroupA2>GroupA3; for a central user in the case of user power unrestricted, the SRS resources are configured in accordance with the order of GroupA1>GroupA0>GroupA3>GroupA2; for an edge user in the case of user power restricted, the SRS resources are configured in accordance with the order of GroupA2>GroupA3>GroupA0>GroupA1; and for a central user in the case of user power restricted, the SRS resources are configured according to the order of GroupA3>GroupA2>GroupA1>GroupA0. Therefore, the UE in the cell 0 is assigned to the position of the GroupA0 of the SRS symbol 0, the UE in the cell 1 is assigned to the position of the GroupA3 of the SRS symbol 1, and the UE in the cell 2 is assigned to the position of the GroupA1 of the SRS symbol 2, as shown in FIG. 6.

Furthermore, the method in accordance with the embodiment of the present invention further comprises the step S105:

in step S105, in the set time period, the number of UEs accessing each cell is statistically collected for multiple times to obtain an average number of UEs accessing each cell; when the average number of UEs is less than the maximum number of orthogonal UEs supported by the system, and the cells which have allocated SRS resources to the UEs cannot be orthogonal with each other, then the allocated SRS resources are reconfigured according to the SRS initial time domain resource configuration order.

In this step, when the predetermined timer expires, statistics is performed on the number of accessing users, and if the number of the statistically collected users does not exceed the maximum number of orthogonal users in each of the consecutive multiple statistics, and the resources allocated to the users cannot guarantee that the cells are orthogonal with each other, the allocated resources are re-adjusted to be resources which are completely orthogonal with the adjacent cells, and the adjusting policy is that resources are allocated in accordance with the order of frequency division, comb division, code division and time division in the same group. If the number of users statistically collected at each time is more than the maximum number of orthogonal users, or the resources allocated to the users can guarantee that the cells are orthogonal with each other, the adjustment of SRS resource is not carried out.

Figure 7:
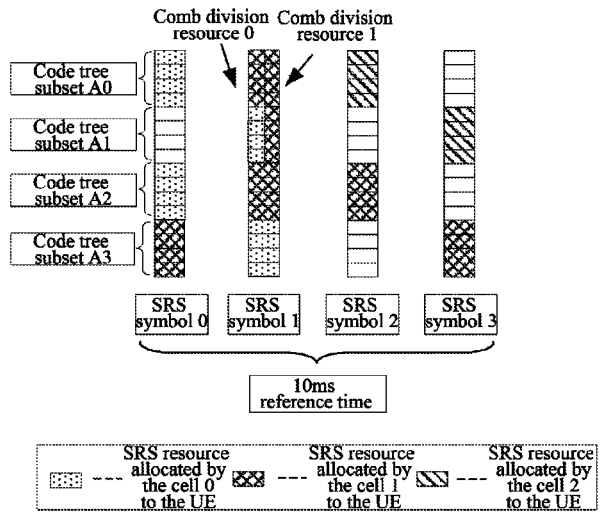
FIG. 7 is a schematic diagram of an allocation before the adaptive adjustment of UE SRS resources in the cooperating cells in accordance with an embodiment of the present invention.
Figure 8:
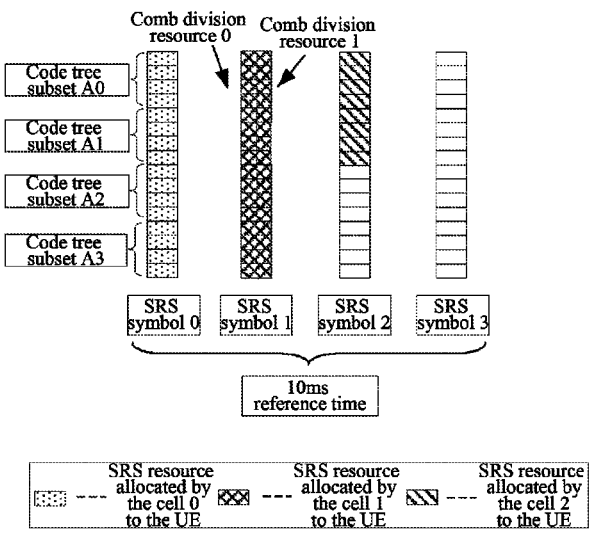
FIG. 8 is a schematic diagram of an allocation after the adaptive adjustment of UE SRS resources in the cooperating cells in accordance with an embodiment of the present invention.

For example, the time length of the timer is set as 200 s, the statistical times within the time length of the timer are set as four times, and the maximum number of orthogonal users supported by the system is 32. When the timer expires, after averaging the results of the four times, it can be found that the number of users in the cell 0 is 4, the number of users in the cell 1 is 7, the number of users in the cell 2 is 2, and the statistical number of users accessing each of the 3 cells is less than 32, and the allocated resources cannot guarantee that the cells are orthogonal with each other, as shown in FIG. 7, then it needs to perform adaptive adjustment in each cell to re-adjust the SRS resource allocation, and the adjusting policy is that resources are allocated in accordance with the order of frequency division, comb division, code division and time division in the same group, as shown in FIG. 8.

In the above steps S103~S105, the mentioned allocation order of frequency division, comb division, code division is a recommended allocation order; in an actual process, the order of frequency division, comb division and code division can be configured arbitrarily.

Figure 9:
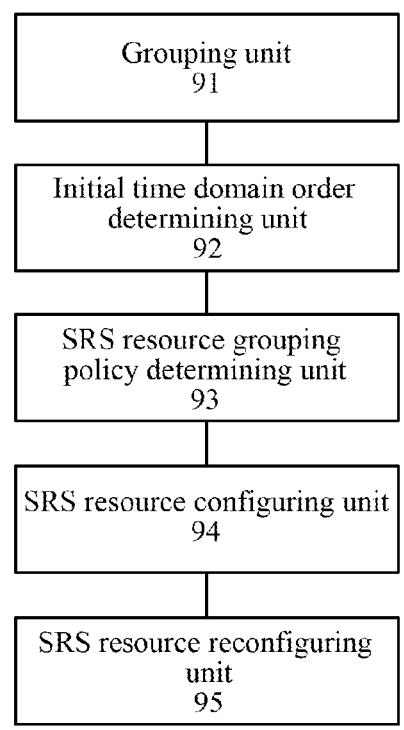
FIG. 9 is a structural diagram of an apparatus for configuring sounding reference signal resources of cooperating cells in accordance with an embodiment of the present invention.

Furthermore, as shown in FIG. 9, the embodiment of the present invention further provides an apparatus for configuring SRS resources of cooperating cells to realize the abovementioned method, comprising:

a grouping unit 91, which is used to group all cells into different cell groups;

an initial time domain order determining unit 92, which is used to determine the SRS initial time domain resource configuration order of each cell group;

a SRS resource grouping policy determining unit 93, which is used to: according to the state information of the UEs, determine the SRS resource grouping policy of the cells; and a SRS resource configuring unit 94, which is used to configure SRS resources for UEs accessing each cell according to the SRS initial time domain resource configuration order and the SRS resource grouping policy.

The grouping unit 91 is used to group all the cells into different cell groups in the following way: grouping all the cells into different cell groups in accordance with the principle that adjacent cells are not in the same cell group.

The initial time domain order determining unit 92 is used to determine the SRS initial time domain resource allocation order of each cell group in the following way:

statistics being performed on the number of SRS symbols within the predetermined reference time period to obtain the number of SRS symbols N according to the SRS subframe configuration; and according to the number of SRS symbols N, allocating the SRS initial time domain resource to each cell group, and determining the SRS initial time domain resource configuration order of each cell group.

The SRS resource grouping policy determining unit 93 is used to determine the SRS resource grouping policy of the cells in accordance with the state information of the user equipment in the following way:

grouping each SRS time domain resource into S groups, wherein S=2M, and M is the ratio of the cell SRS bandwidth to the UE SRS bandwidth; the total code tree set corresponding to different frequency division resources and comb division resources being marked as Φ, wherein Φ={k∈Z, 0≤k≤S−1, Z is an integer}; and when there are x kinds of state information of the user equipment, each kind of state information of the user equipment corresponds to one code tree subset GroupAi, wherein GroupAi={k|mod (k, x)=i}, i∈(0, 1, . . . , x−1), GroupAi={k|mod (k, x)=i} represents the set of remainder i obtained from dividing k by x.

The state information of the user equipment comprises: user attributes and field strength information; wherein the user attributes comprise central users or edge users; the field strength information comprises user power restricted or unrestricted; the corresponding code tree subset is determined according to the state information of the user equipment: in the case of user power unrestricted, the code tree subset corresponding to the edge users is marked as GroupA0 and the code tree subset corresponding to the central users is marked as GroupA1; in the case of user power restricted, the code tree subset corresponding to the edge users is marked as GroupA2 and the code tree subset corresponding to the central users is marked as GroupA3.

The SRS resource configuring unit 94 is used to configure SRS resources for user equipments accessing each cell in the following way:

when a user equipment establishes an initial connection, according to the SRS initial time domain resource configuration order corresponding to the cell to which the user equipment belongs, and the initial frequency domain resource order of GroupA0>GroupA1>GroupA2> . . . > GroupA(X−1), allocating initial SRS resources to the user equipment.

The SRS resource configuring unit 204 is used to configure SRS resources for user equipments accessing each cell in the following way:

after obtaining the state information of a user equipment, or when the state information of a user equipment changes, obtaining the latest state information i of the user equipment; and according to the latest state information i of the user equipment, configuring the GroupAi resource corresponding to the latest state information for the user equipment; and if the GroupAi does not have idle resources, configuring SRS resources for the user equipment according to the priority order of the frequency domain resources.

The apparatus further comprises:

a SRS resource reconfiguring unit 95, which is used to: within the set time period, perform statistics on the number of user equipments accessing each cell for multiple times to obtain the average number of user equipments accessing each cell; when the average number of user equipments is less than the maximum number of orthogonal user equipments supported by the system, and the cells which have allocated SRS resources to the user equipment cannot be orthogonal with each other, then reconfigure the allocated SRS resources according to the SRS initial time domain resource configuration order.

As can be seen from the abovementioned embodiments, the embodiments of the present invention comprehensively consider the situations of each cell and its adjacent cells to make adjacent cells occupy different SRS symbols in the time domain when allocating the SRS resources, and also through the adaptive adjustments of SRS allocation, it guarantees that in the case that the number of users is relatively small, the SRSs in adjacent cells are completely orthogonal with each other; meanwhile, the users are grouped according to the user attributes and user field information to avoid interference between the user SRSs within the cell, thus greatly improving the accuracy of SRS measurement; moreover, in the embodiment of the present invention, it can reduce the signaling interaction between respective cooperating cells in the CoMP, and has regularity in the SRS resource allocation, which can effectively suppress the inter-cell interference; and ultimately improve spectrum efficiency of the system, especially improve the spectrum efficiency of users at the edge of the cell.

Although the preferred embodiments of the present invention have been disclosed for the purposes of illustration, those skilled in the art will realize that various modifications, additions and substitutions are possible, and therefore, the scope of the present document should not be limited to the abovementioned embodiments.

INDUSTRIAL APPLICABILITY

The method and apparatus in accordance with the embodiment of the present invention can be used to reduce signaling interaction of respective cooperating cells in the CoMP, and also have regularity in the SRS resource allocation, which can effectively suppress inter-cell and intra-cell interferences, and improve the spectrum efficiency of the system, and especially improve the spectrum efficiency of users at the edge of the cell.

What is claimed is:

1. A method for configuring sounding reference signal (SRS) resources of cooperating cells, comprising:
   grouping all cells into different cell groups;
   determining a SRS initial time domain resource configuration order of each cell group;
   determining a SRS resource grouping policy of the cell according to state information of user equipment; and
   configuring SRS resources for user equipments accessing each cell according to the SRS initial time domain resource configuration order and the SRS resource grouping policy;
   wherein, determining the SRS resource grouping policy of the cell according to the state information of a user equipment (UE) comprises:
   dividing each SRS time domain resource into S groups, wherein S=2M, and M is a ratio of a cell SRS bandwidth to a UE SRS bandwidth; a total code tree set corresponding to different frequency division resources and comb division resources being marked as Φ, wherein, Φ={k∈Z, 0≤k≤S−1, Z is an integer}; and
   when there are x kinds of state information of the UE, each kind of state information of the UE corresponding to one code tree subset GroupAi, wherein, GroupAi={k|mod (k, x)=i}, i∈(0, 1, . . . , x−1), GroupAi={k/mod (k, x)=i} represents a set of remainder i obtained from k divided by x.

2. The method of claim 1, wherein, grouping all the cells into different cell groups comprises:
  grouping all the cells into different cell groups in accordance with a principle that adjacent cells are not in the same cell group.

3. The method of claim 2, wherein, determining the SRS initial time domain resource configuration order of each cell group comprises:
  performing statistics on the number of SRS symbols within a predetermined reference time period to obtain the number of SRS symbols N according to a SRS sub-frame configuration; and
  allocating SRS initial time domain resources to each cell group and determining the SRS initial time domain resource configuration order of each cell group according to the number of SRS symbols N.

4. The method of claim 1, wherein, configuring SRS resources for user equipments accessing each cell comprises:
  when a user equipment establishes an initial connection, allocating an initial SRS resource for the user equipment according to a SRS initial time domain resource configuration order corresponding to the cell to which the user equipment belongs, as well as an initial frequency domain resource order of GroupA0>GroupA1>GroupA2> . . . >GroupA(X−1).

5. The method of claim 4, wherein, configuring SRS resources for user equipments accessing each cell comprises:
  after obtaining the state information of a user equipment, or when the state information of a user equipment changes, obtaining latest state information i of the user equipment; and
  according to the latest state information i of the user equipment, configuring a GroupAi resource corresponding to the latest state information for the user equipment; and if the GroupAi does not have idle resources, configuring a SRS resource for the user equipment according to a priority order of frequency-domain resources.

6. The method of claim 1, further comprising: after configuring the SRS resources for UEs accessing each cell,
  within a set time period, performing statistics on the number of UEs accessing each cell for multiple times to obtain the average number of UEs accessing each cell; and
  when the average number of UEs is less than the maximum number of orthogonal UEs supported by a system and cells which have allocated SRS resources to UEs cannot be orthogonal with each other, reconfiguring the allocated SRS resources according to the SRS initial time domain resource configuration order.

7. An apparatus for configuring sounding reference signal (SRS) resources of cooperating cells, comprising a processor configured to:
  group all cells into different cell groups;
  determine a SRS initial time domain resource configuration order of each cell group;
  determine a SRS resource grouping policy of the cell according to state information of UEs; and
  configure SRS resources for UEs accessing each cell according to the SRS initial time domain resource configuration order and the SRS resource grouping policy;
  wherein the processor is configured to determine the SRS resource grouping policy of a cell in accordance with the state information of the user equipment in a following way:
  grouping each SRS time domain resource into S groups, wherein S=2M, and M is a ratio of a cell SRS bandwidth to a UE SRS bandwidth; a total code tree set corresponding to different frequency division resources and comb division resources being marked as $\Phi$, wherein, $\Phi=\{k \in Z, 0 \leq k \leq S-1, Z \text{ is an integer}\}$; and
  when there are x kinds of state information of the user equipment, each kind of state information of the user equipment corresponding to one code tree subset GroupAi, wherein, GroupAi=$\{k|\text{mod}(k, x)=i\}$, $i \in (0, 1, \ldots, x-1)$, GroupAi=$\{k/\text{mod}(k, x)=i\}$ represents a set of remainder i obtained from k divided by x.

8. The apparatus of claim 7, wherein, the processor is configured to group all the cells into different cell groups in a following way:
  grouping all the cells into different cell groups in accordance with a principle that adjacent cells are not in the same cell group.

9. The apparatus of claim 8, wherein, the processor is configured to determine the SRS initial time domain resource configuration order of each cell group in a following way:
  performing statistics on the number of SRS symbols within a predetermined reference time period to obtain the number of SRS symbols N according to a SRS subframe configuration; and
  allocating SRS initial time domain resources to each cell group and determining the SRS initial time domain resource configuration order of each cell group according to the number of SRS symbols N.

10. The apparatus of claim 7, wherein, the processor is configured to configure SRS resources for UEs accessing each cell in a following way:
  when a UE establishes an initial connection, allocating an initial SRS resource to the UE according to a SRS initial time domain resource configuration order corresponding to the cell to which the UE belongs, and an initial frequency domain resource order of GroupA0>GroupA1>GroupA2> . . . >GroupA(X−1).

11. The apparatus of claim 10, wherein, the processor is configured to configure the SRS resources for user equipments accessing each cell in a following way:
  after obtaining the state information of a user equipment, or when the state information of a user equipment changes, obtaining latest state information i of the user equipment; and
  according to the latest state information i of the user equipment, configuring a GroupAi resource corresponding to the latest state information for the user equipment; and if the GroupAi does not have idle resources, configuring a SRS resource for the user equipment according to a priority order of the frequency domain resources.

12. The apparatus of claim 7, the processor is further configured to within a set time period, perform statistics on the number of UEs accessing each cell for multiple times to obtain an average number of UEs accessing each cell; when the average number of UEs is less than the maximum number of orthogonal UEs supported by a system, and cells which allocate SRS resources to UEs cannot be orthogonal with each other, reconfigure the allocated SRS resources according to the SRS initial time domain resource configuration order.

13. The method of claim 4, further comprising: after configuring the SRS resources for UEs accessing each cell,
- within a set time period, performing statistics on the number of UEs accessing each cell for multiple times to obtain the average number of UEs accessing each cell; and
- when the average number of UEs is less than the maximum number of orthogonal UEs supported by a system and cells which have allocated SRS resources to UEs cannot be orthogonal with each other, reconfiguring the allocated SRS resources according to the SRS initial time domain resource configuration order.

14. The method of claim 5, further comprising: after configuring the SRS resources for UEs accessing each cell,
- within a set time period, performing statistics on the number of UEs accessing each cell for multiple times to obtain the average number of UEs accessing each cell; and
- when the average number of UEs is less than the maximum number of orthogonal UEs supported by a system and cells which have allocated SRS resources to UEs cannot be orthogonal with each other, reconfiguring the allocated SRS resources according to the SRS initial time domain resource configuration order.

15. The apparatus of claim 10, the processor is further configured to: within a set time period, perform statistics on the number of UEs accessing each cell for multiple times to obtain an average number of UEs accessing each cell; when the average number of UEs is less than the maximum number of orthogonal UEs supported by a system, and cells which allocate SRS resources to UEs cannot be orthogonal with each other, reconfigure the allocated SRS resources according to the SRS initial time domain resource configuration order.

16. The apparatus of claim 11, the processor is further configured to: within a set time period, perform statistics on the number of UEs accessing each cell for multiple times to obtain an average number of UEs accessing each cell; when the average number of UEs is less than the maximum number of orthogonal UEs supported by a system, and cells which allocate SRS resources to UEs cannot be orthogonal with each other, reconfigure the allocated SRS resources according to the SRS initial time domain resource configuration order.

* * * * *